US012765645B2

(12) United States Patent
Dyckmans et al.

(10) Patent No.: US 12,765,645 B2
(45) Date of Patent: Oct. 20, 2026

(54) METHOD FOR MANUFACTURING A SHOE, A SYSTEM FOR PERFORMING THE METHOD, AND A SHOE

(71) Applicant: adidas AG, Herzogenaurach (DE)

(72) Inventors: Christoph Dyckmans, Fuerth (DE); Andreas J. Seefried, Veitsbronn (DE); Bastian Gothe, Erlangen (DE); Maximilian Drexler, Wilhermsdorf (DE); Amir Fathi, Ho Chi Minh City (VN); Tru Le, Herzogenaurach (DE); Chris Holmes, Grossenseebach (DE)

(73) Assignee: adidas AG, Herzogenaurach (DE)

( * ) Notice: Subject to any disclaimer, the term of this patent is extended or adjusted under 35 U.S.C. 154(b) by 0 days.

(21) Appl. No.: 18/485,755

(22) Filed: Oct. 12, 2023

(65) Prior Publication Data

US 2024/0122305 A1 Apr. 18, 2024

(30) Foreign Application Priority Data

Oct. 14, 2022 (DE) ......................... 102022210886.8

(51) Int. Cl.
*A43D 86/00* (2006.01)
*A43B 1/14* (2006.01)
*B29D 35/06* (2010.01)

(52) U.S. Cl.
CPC ................ *A43D 86/00* (2013.01); *A43B 1/14* (2013.01); *B29D 35/065* (2013.01)

(58) Field of Classification Search
CPC ......... A43D 86/00; A43B 1/14; B29D 35/065
USPC ............................................................ 12/4.1
See application file for complete search history.

(56) References Cited

U.S. PATENT DOCUMENTS

2008/0083485 A1* 4/2008 Chi ......................... B29C 65/18 156/245
2014/0250720 A1* 9/2014 Miner .................. A43B 1/0027 36/29
2014/0262010 A1 9/2014 Heineck et al.
2015/0101134 A1* 4/2015 Manz ..................... A43D 95/00 12/142 R
2016/0066649 A1* 3/2016 Foley ................... B29D 35/142 156/380.5

(Continued)

FOREIGN PATENT DOCUMENTS

DE 102016208998 A1 11/2017
DE 102016209044 A1 11/2017

(Continued)

OTHER PUBLICATIONS

Office Action, German Patent Application No. 10 2022 210 886.8, Mar. 23, 2023, 17 pages.

(Continued)

*Primary Examiner* — Timothy K Trieu
(74) *Attorney, Agent, or Firm* — Kilpatrick Townsend & Stockton LLP

(57) ABSTRACT

The present disclosure relates to a method for manufacturing a shoe, in particular a sports shoe, comprising the steps of providing a plurality of individual particles for a sole element in a mold, providing an upper in the mold, and fusing the plurality of individual particles and the upper by means of an electromagnetic field to bond the plurality of individual particles with each other and with the upper.

18 Claims, 3 Drawing Sheets

(56) References Cited

U.S. PATENT DOCUMENTS

| | | | | |
|---|---|---|---|---|
| 2016/0150855 | A1* | 6/2016 | Peyton | A43B 13/189 36/29 |
| 2016/0227876 | A1* | 8/2016 | Le | A43B 13/187 |
| 2018/0071980 | A1* | 3/2018 | Lomasney | C25D 5/617 |
| 2018/0147752 | A1 | 5/2018 | Nürnberg et al. | |
| 2018/0345576 | A1 | 12/2018 | Constantinou et al. | |
| 2019/0239596 | A1* | 8/2019 | Ploem | A43B 9/18 |
| 2020/0070456 | A1 | 3/2020 | Hsiao | |
| 2021/0107188 | A1* | 4/2021 | Weiger | B29C 44/58 |
| 2021/0127796 | A1* | 5/2021 | Hsiao | A43B 9/12 |
| 2021/0387433 | A1 | 12/2021 | Kumami et al. | |

FOREIGN PATENT DOCUMENTS

| | | | |
|---|---|---|---|
| DE | 102016209045 | A1 | 11/2017 |
| DE | 102016223980 | A1 | 6/2018 |
| EP | 3338984 | B1 | 11/2021 |
| JP | S59-186256 | A | 10/1984 |
| JP | 2014-511741 | A | 5/2014 |
| JP | 2020-163788 | A | 10/2020 |

OTHER PUBLICATIONS

European Extended Search Report, European Patent Application No. 23203435.5, Mar. 4, 2024, 9 pages.

Decision of Rejection, Japanese Patent Application No. 2023-177154, Apr. 15, 2025, 6 pages.

Office Action, Japanese Patent Application No. 2023-177154, Dec. 10, 2024, 10 pages.

Office Action, German Patent Application No. 10 2022 210 886.8, Jun. 10, 2025, 8 pages.

European Extended Search Report, European Patent Application No. 26159217.4, Apr. 30, 2026, 10 pages.

Office Action, Chinese Patent Application No. 202311319159.5, Apr. 30, 2026, 11 pages.

* cited by examiner

METHOD FOR MANUFACTURING A SHOE, A SYSTEM FOR PERFORMING THE METHOD, AND A SHOE

CROSS REFERENCE TO RELATED APPLICATIONS

This application claims priority to German Patent Application 10 2022 210 886.8, filed on Oct. 14, 2022, the entire contents and disclosure of which are incorporated by reference herein.

TECHNICAL FIELD

The present invention relates to a method for manufacturing a shoe, in particular a sports shoe, a system for performing the method and a shoe.

BACKGROUND

Conventional methods for manufacturing shoes generally follow an assembly-based approach (i.e., stock fitting of the components) and involve processing various individual components, such as premanufactured soles and uppers, at different processing stations, which are then later joined in a further separate location. These manufacturing methods are typically very complicated and labor intensive as well as require chemical use of dangerous substances to glue the stock fitted components together.

To overcome these disadvantages applicant disclosed in DE 10 2016 208 998 A1, DE 10 2016 209 044 A1 and DE 10 2016 209 045 A1 sole molds, methods and systems for the manufacture of a plurality of complete shoes. However, these methods leave still room for improvement.

The use of particle foam materials, i.e., materials made from individual particles of expanded plastic materials, also referred to as expanded foam beads and bead foams, has found its way into the manufacture of cushioning elements for the manufacture of soles for sports shoes. In particular, the use of particles of expanded thermoplastic polyurethane, eTPU, which are fused at their surfaces by subjecting them to pressurized steam within a mold (often called "steam chest molding" in the art), has been considered for the manufacture of soles.

However, conventional molds for steam chest molding soles are not optimally adapted to the specific requirements of the shoe production process. For example, the steam chest molding process of a sole made from particles with a conventional mold requires a large amount of energy for heating the mold, because conventional molds typically have a high mass. Moreover, the cooling process of such molds is slow and therefore leads to extended cycle times. Finally, steam chest molding soles from particles requires uniformly supplying the pressurized steam to the particles in order to achieve a homogeneous interconnection of the particles. Due to their construction, conventional molds are not optimally adapted to such a uniform medium supply.

Energy carriers other than pressurized steam have also been considered. In particular, a method for the manufacture of a sole element has been described by the applicant in DE 10 2016 223 980 A1, wherein a mold is loaded with a first material which comprises particles of an expanded material, and, during loading the mold, the particles are pre-heated by supplying energy in the form of at least one electromagnetic field.

A common disadvantage of the disclosed methods is that they do not yet take full account of the overall production of complete shoes, which is still very complicated and labor intensive, in particular, for the manufacture of modern performance footwear like sports shoes requiring specific material characteristics.

It is therefore an object underlying the present invention to overcome said disadvantages of the prior art and to provide an improved method for the manufacture of shoes, wherein the manufacturing effort shall be optimized, and the method shall further be as energy efficient as possible while making do without environmentally harmful or hazardous substances.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various embodiments of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

In some aspects, the present disclosure is directed to a method for manufacturing a shoe, comprising the steps of: a. providing a plurality of individual particles for a sole element in a mold; b. providing an upper in the mold; and c. fusing the plurality of individual particles and the upper by means of an electromagnetic field to bond the plurality of individual particles with each other and with the upper. The method may comprise at least one of the following steps: d. providing a supporting element for the sole element in the mold; e. providing an outsole element for the sole element in the mold; and f. wherein step c. further comprises fusing the supporting element and the outsole element by means of the electromagnetic field to bond the plurality of individual particles with each other, with the supporting element, with the outsole element and with the upper. In some aspects, step c. is performed in one single step. In some aspects, the electromagnetic field is in the radio frequency range of 30 kHz to 300 MHz. In other aspects, the electromagnetic field is in the microwave range of 300 MHz to 300 GHz. Step c. may be performed without an adhesive. The method may further comprise locally adjusting a field strength distribution of the electromagnetic field within the mold. The energy may be supplied by means of the electromagnetic field is varied over time. In some aspects, more energy by means of the electromagnetic field is supplied to the plurality of individual particles and/or the upper in a first partial region of the mold than in a second partial region of the mold. In some aspects, step c. further comprises the step of fusing the surfaces of the plurality of individual particles and/or the surface of the upper. The method may further comprise arranging a connection layer between the plurality of individual particles for the sole element and the upper before step c. In some aspects, step c. further comprises molding the sole element from the plurality of individual particles. The plurality of individual particles and/or the upper may be pre-heated in the mold prior to step c. The mold may comprise a polymer material. The polymer material may be a thermoplastic material comprising at least one of the following: polyethylene terephthalate(PET), polybutylene terephthalate (PBT), polyoxymethylene (POM), polyamide-imide (PAI), polycarbonate (PC), polyketones (PK), polyether ether ketone (PEEK), polyvinylidene fluoride, polyvinylidene difluoride (PVDF), thermoplastic polyurethane (TPU), and/or polyethylene (PE). The plurality of individual particles may comprise a foamed material based on at least one of the following: expanded thermoplastic polyurethane (eTPU), expanded polyamide (ePA), expanded polyetherblockamide (ePEBA), polylactide (PLA), polyether-block-amide (PEBA), expanded polyethylene terephthalate (ePET), expanded polybutylene terephthalate (ePBT), expanded thermoplastic polyester ether elastomer (eTPEE), and/or expanded polystyrene (ePS). The upper may be a textile upper and may comprise at least one of the following: a knitted construction, a woven construction, a non-woven construction, randomly deposited fibers, a multi-directional layered material, and/or a mesh structure.

In some aspects, the present disclosure is directed to a system comprising means for performing a method for manufacturing a shoe, comprising the steps of: a. providing a plurality of individual particles for a sole element in a mold; b. providing an upper in the mold; and c. fusing the plurality of individual particles and the upper by means of an electromagnetic field to bond the plurality of individual particles with each other and with the upper.

In some aspects, the present disclosure is directed to a shoe manufactured by: a. providing a plurality of individual particles for a sole element in a mold; b. providing an upper in the mold; and c. fusing the plurality of individual particles and the upper by means of an electromagnetic field to bond the plurality of individual particles with each other and with the upper. In some aspects, the shoe does not comprise an adhesive.

BRIEF DESCRIPTION OF THE FIGURES

In the following detailed description, embodiments of the invention are described referring to the following figures.

BRIEF DESCRIPTION

Figure 1:
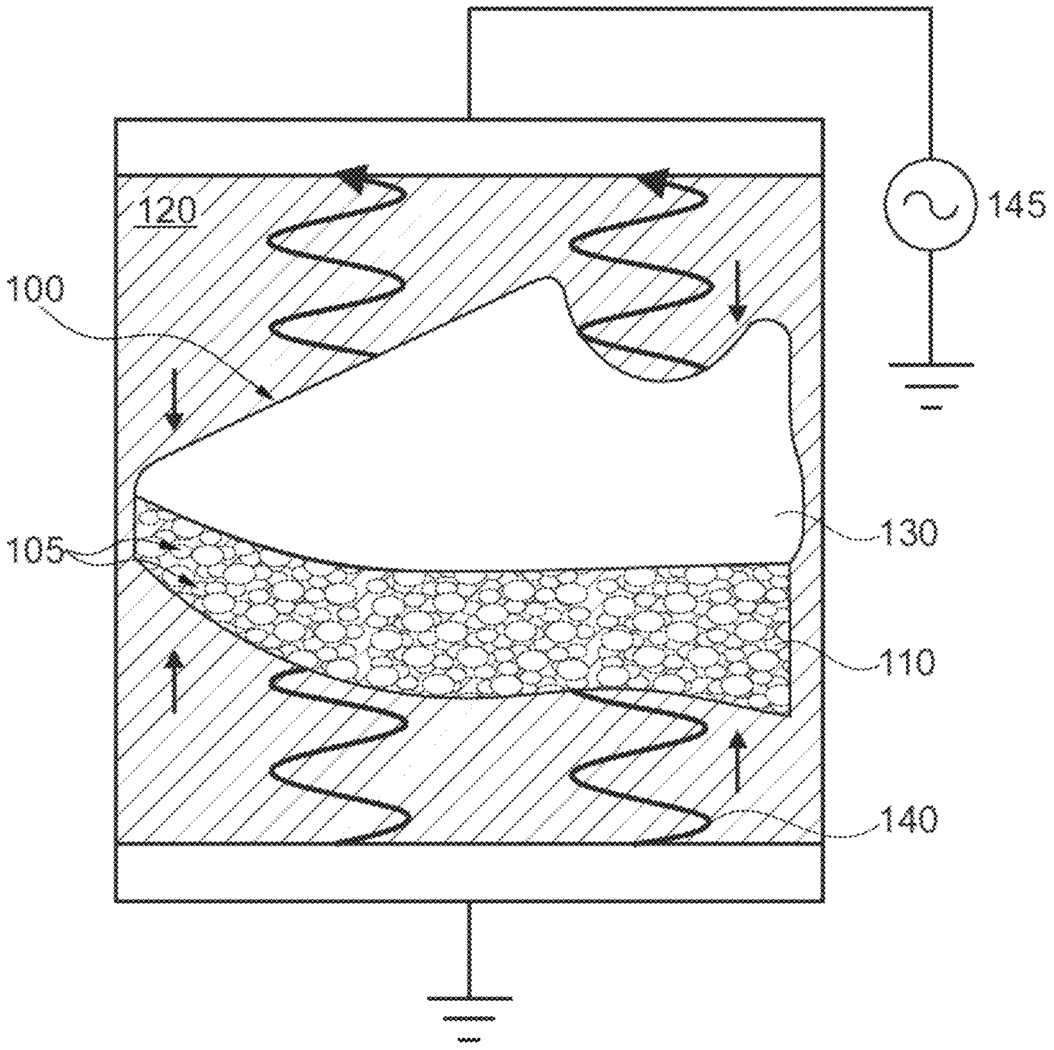
FIG. 1: illustrates the method of the present invention for manufacturing a complete shoe in a mold.

The object(s) described herein is accomplished by the teachings of the independent claims. Desirable embodiments are contained in the dependent claims.

According to an aspect of the present invention, a method for manufacturing a shoe, in particular a sports shoe, comprises the steps of providing a plurality of individual particles for a sole element in a mold, providing an upper in the mold, and fusing the plurality of individual particles and the upper by means of an electromagnetic field to bond the plurality of individual particles with each other and with the upper.

By fusing the plurality of individual particles and the upper with electromagnetic energy from an electromagnetic field the present invention provides an improved method for the whole manufacture of a shoe. The individual foamed particles may be fused together to be bonded with each other so that they may form the sole element and the upper may be fused to be bonded (or joined) in a durable and permanent manner with this manufactured sole element. In other words, the two key components for the shoe, namely the sole element and the upper, may be joined together within the same mold. For example, the softened (or partially melted) surface region of the particles showing at the top surface of the sole element may be used as a bonding/joining agent to connect the upper to the top of the sole element. In this way, at least one of the amount of energy the number of process steps, the number of additional or intermediary components, the processing time and the assembly steps (and accompanying labor steps) may be reduced. In the context of the present application, it should be noted that fusing and bonding may be performed at different processing times and/or temperatures, e.g., the plurality of individual particles may be fused at a lower temperature than bonding of the plurality of individual particles to the upper, or may be performed simultaneously due to different local energy amounts of the electromagnetic field and/or different mold temperatures. Moreover, in some embodiments, different processing times of fusing and bonding may also be used when a connecting layer like an adhesive layer is used.

Moreover, using electromagnetic energy from an electromagnetic field for the manufacture of the sole element, and the whole shoe, may help to reduce the molding time, to save energy, for example, by avoiding excessive energy absorption by the mold, and also to facilitate cooling and stabilization of the molded sole element, because, for example, the energy provision is not coupled to any kind of material transport, like injection of energetic steam. In addition, the electromagnetic field may be chosen such that it permeates the mold loaded with the plurality of individual particles for the sole element and the upper so that improved fusing/molding and bonding may be achieved throughout the entire shoe and in every depth of the shoe. In this way, the overall manufacture of the shoe may be significantly simplified because it may be manufactured in one process step by bonding the compact material of the upper with the foamed material of the sole element.

The individual particles of this application may also be called "expanded materials", "expanded particles", "expanded pellets", "expanded beads", "foam particles", "foamed particles", "foamed pellets" or "foamed beads" and the manufactured sole element may consequently be called a "particle foam", "bead foam", "pellet foam" component or element. Other terms by which such foamed particles may be referred to within the field of particle foams may also be used.

The material of the upper and the upper itself of the present application may be created using different techniques known in the art. In one embodiment, the material of the upper may be a textile material upper. Generally, the textile of the present application may be a flexible material that is manufactured by creating yarns of material. The yarns can be monofilament or multifilament yarns where the multifilament yarns are an interlocking bundle of fibers or threads which are produced by spinning raw fibers (from either natural or synthetic sources) into long and twisted lengths, wherein the textile may be formed into an upper component by weaving, knitting, crocheting, knotting, tatting, felting, bonding, or braiding these yarns together. Moreover, the term "fabric" may be used as a synonym for the textile of the present application. In some embodiments, the upper comprises a leather, a synthetic leather material, in particular with thermoplastic polyurethane, or a composite material of one of the above-mentioned textile and a non-textile material.

In the context of the present application, it should be noted that the term "bond" may be used synonymously with the terms "attach", "firmly join", "secure", "interconnect" or "connect" in order to manufacture the sole element from individual particles and to bond with the textile upper in a durable, firm and permanent manner.

The method may further comprise the step of providing a supporting element for the sole element in the mold and/or the step of providing an outsole element for the sole element in the mold, wherein the above-mentioned step of fusing may further comprise the step of fusing the supporting element and the outsole element by means of the electromagnetic field to bond the plurality of individual particles with each other, with the supporting element, with the outsole element and with the upper. In some embodiments, only at least two of the following: the plurality of individual particles, the supporting element, the outsole element or the upper, are fused to be bonded to each other by means of the electromagnetic field. The supporting element may be at least one of the following: a reinforcing element, a textile sheet like a knit fabric, a woven fabric, a non-woven fabric, a molded component, a heel counter, a sole plate, a medial support element, a lateral support element, a toe support element, a bonding layer, a composite element, for example, and elements comprising leather or synthetic leather and other commonly used elements in the state of the art. In the context of the present application, it should be noted that the term "element" may be used synonymously with the term "component".

By providing one or both of these two key elements for the sole element, namely the supporting element and the outsole element, the overall manufacture of the whole shoe may be further improved by reducing the processing time of the sole element, because pre- or post-productions steps for one or both of these two elements may not be necessary anymore. Also, there is no need for a plurality of automated production stations for the two elements, which reduces the required footprint of the manufacturing systems in a facility. Moreover, these described embodiments may also help to provide an improved shoe, in particular a sports shoe, with the mentioned increased material characteristics, because, for example, the supporting element may provide special sole properties such as selective support against pronation or supination.

At least one of the above-mentioned steps of fusing may be performed in one single step. This emphasizes the above-mentioned advantages of the claimed method for the simplification and optimization of the overall manufacture of the shoe in one single process step within the mold. It should be noted that the expression "at least one of the above-mentioned steps of fusing" as used in the present application refers to the step of fusing the plurality of individual particles and the upper by means of an electromagnetic field to bond the plurality of individual particles with each other and with the upper, the step of fusing the supporting element and the outsole element by means of the electromagnetic field to bond the plurality of individual particles with each other, with the supporting element, with the outsole element and with the upper, as well as the step that only at least two of the plurality of individual particles, the supporting element, the outsole element or the upper are fused to be bonded to each other by means of the electromagnetic field.

The electromagnetic field may be in the radio frequency range of 30 kHz to 300 MHz, e.g., in the range of 1 MHz to 200 MHz, in the range of 1 MHz to 50 MHz, in the range of 25 to 30 MHz or in the microwave range, 300 MHz to 300 GHz. In some embodiments, the electromagnetic field may have a frequency in the radio frequency range around 27.12 MHz. In some embodiments, at least one radio frequency or radio frequency ranges may be used.

Radio frequency generators are also commercially available and may be easily implemented in a system for manufacturing shoes. Moreover, also radio frequency radiation may be focused on the respective parts of the system and its intensity and frequency may be adapted to the requirements.

Microwave generators are commercially available and may be implemented into a system for manufacturing shoes for using an inventive method with comparatively little effort. In addition, it may be possible to focus the microwave radiation essentially onto a cavity of the mold in which the plurality of individual particles and the textile upper are provided such that the energy efficiency may be increased. Furthermore, the intensity and frequency of the microwave radiation may easily be changed and adapted to the respective requirements of the shoe components such as the sole element and the textile upper.

It is further possible that the electromagnetic field, in particular electromagnetic radiation, is supplied in a frequency range different from the frequency ranges mentioned above.

At least one of the above-mentioned steps of fusing may be performed without an adhesive. This may help to reduce the amount of toxic or hazardous materials like glue during the manufacture of soles and the whole shoe and to avoid causing any harm to the manufacturing facility and its environment.

At least one of the above-mentioned steps of fusing may be performed without using infrared radiation. This may help to avoid undesirable destructions of the respective elements of the sole element, such as the individual particles, the supporting element or the outsole element, as well as the upper. Of course, in some embodiments, a further curing of the shoe by supplying heat energy from infrared radiation may be used and should not be excluded from the claimed invention. The above-mentioned steps of fusing may also be performed without at least one of other joining techniques like gluing, welding, high frequency welding, ultrasonic welding, laser welding, crimping, sewing, screwing, riveting, fusing, clipping, sealing, subjecting to a heat pres-sure treatment, exposing to a steam treatment.

The method may further comprise the step of locally adjusting a field strength distribution of the electromagnetic field within the mold. This may enable consistent energy application to the elements in the mold with varying thickness, such as the sole element (or midsole) or the upper of the shoe, or varying thickness of the mold itself. For example, higher density material in elements of the shoe may heat quicker for fusing, and, therefore, the field strength distribution of the electromagnetic field may be locally adjusted so that more energy may be absorbed by these elements to balance with the energy absorption of lower density areas. In this way, the properties of the individual elements of the shoe may be influenced in a simpler way than by applying different varying electromagnetic fields, e.g., with different varying frequencies.

The energy supplied by means of the electromagnetic field may be varied over time. For example, the energy supplied by means of the at least one electromagnetic field may be gradually increased over time. In this way, a time varying magnetic flux from the electromagnetic induc-tion of the varying electromagnetic field may create eddy currents in an electrically conducting material of the particles and the upper, which heat up the material and hence contribute to the fusing of the surfaces of the particles and the upper.

More energy by means of the electromagnetic field may be supplied to the plurality of individual particles and/or the upper in a first partial region of the mold than in a second partial region of the mold. This may apply both to a pre-heating of the particles and/or the upper within the mold as well as to the fusing of the particles and the upper. In this way, different partial regions may be created within the shoe, which differ in their respective thickness, stiffness, breathability, flexibility, elasticity, feel, appearance or with regard to other characteristics to facilitate the manufacture.

At least one of the above-mentioned steps of fusing may further comprise the step of fusing the surfaces of the plurality of individual particles and/or the surface of the upper. This may allow the manufacture of the sole element and/or the whole shoe with various thicknesses and complex geometry, because supplying the energy is not coupled to any kind of material transport of the sole element and/or the upper, as for example the introduction of a binder or steam. As mentioned above, the electromagnetic field may be chosen such that it permeates the mold loaded with the individual particles for the sole element and the upper essentially homogene-ously and supplies an essentially constant amount of energy to all particles and the upper such that a homogeneous and constant fusing of the surfaces of the particles and/or the upper may be achieved throughout the shoe and in every depth of the individual shoe components. Alternatively, the electromagnetic field may be chosen such that the supply of energy to the particles and the upper arranged within the mold changes locally, as described above. In this way, the nature and degree of the fusing of the surfaces of the particles and/or the upper may be influenced locally. In particular, the fusing of the particle surfaces within the interior of the sole element may be controlled independently of the fusing of the particle surfaces at the surface of the sole element. Summarizing above, these embodiments may help to provide a better bond between the sole element and the textile upper.

The method may further comprise the step of arranging a connection layer between the plurality of individual particles for the sole element and the textile upper before at least one of the above-mentioned steps of fusing. Such an embodiment may provide a kind of protection layer for the particles to avoid uneven surfaces of the manufactured sole element, which could penetrate into the textile upper and lead to an uncomfortable wearing comfort for the wearer of the shoe. In some embodiments, the textile upper is protected by such a connection layer.

At least one of the above-mentioned steps of fusing may further comprise the step of molding the sole element from the plurality of individual particles. Molding sole elements from a plurality of individual particles is a particularly efficient method for the manufacture of shoes. In addition, molding particles as a sole element as a kind of particle foam component does not involve toxic or hazardous materials.

The plurality of individual particles and/or the upper may be pre-heated in the mold prior to at least one of the above-mentioned steps of fusing. Pre-heating may be achieved by an electromagnetic field. The type/nature of the electromagnetic field used for the pre-heating may be different to the type/nature of the electromagnetic field used for fusing the particles and the upper. However, it is also possible that the type/nature of electromagnetic field used for the pre-heating is the same as the type/nature of the electromagnetic field used for fusing the particles and the upper. By pre-heating the particles and/or the upper the amount of energy that must be supplied to the particles and/or the upper within the mold may be reduced, which may further help to reduce the processing time, save energy, for example, by avoiding excessive energy absorption by the mold, and also facilitate cooling and stabilization of the manufactured shoe, as explained above. Pre-heating the particles and/or the upper may also contribute to allowing a more fine-tuned control of the manufacturing method in general, as different subsets of the parti-des used for the manufacture of the sole element may be pre-heated to different degrees, for example.

The mold used in the above-mentioned methods may comprise a polymer material, such as a thermoplastic material, in some embodiments at least one of the following: polyethylene terephthalate, PET, polybutylene terephthalate, PBT, polyoxymethylene, POM, polyamide-imide, PAI, polycarbonate, PC, polyketones, PK, polyether ether ketone, PEEK, polyvinylidene fluoride or polyvinylidene difluoride, PVDF, thermoplastic polyurethane, TPU, or polyethylene, PE. Moreover, the polymer material for the mold may comprise a foamed material. These materials have turned out to be beneficial and may hence be used in the context of the present invention. For example, POM has a dielectric loss factor D of approximately 0.008 for radio frequency radiation. This material may thus be essentially transparent to radio frequency radiation, since it absorbs only a small portion of the electromagnetic field and may, due to the relatively low loss factor, be formed with a certain thickness. The polymer material may be adapted to increase the permittivity of the mold compared to the shoe to be manufactured or elements thereof. The polymer material may be adapted to increase the dielectric loss factor of the mold.

The plurality of individual particles used in the above-mentioned methods may comprise a foamed material, in some embodiments based on at least one of the following: expanded thermoplastic polyurethane, eTPU, expanded polyamide, ePA, expanded polyetherblockamide, ePEBA, polylactide, PLA, polyether-block-amide, PEBA, expanded polyethylene terephthalate, ePET, expanded polybutylene terephthalate, ePBT, expanded thermoplastic polyester ether elastomer, eTPEE, expanded polystyrene, ePS. For example, for use in the manufacture of soles, particles of eTPU, ePEBA and/or ePA have turned out to be beneficial and may hence be used in the context of the present invention. Using a foamed material for both the particles and for the surface of the mold leads to a similar loss factor so that a substantially uniform heating of both the particles and the mold may be provided so that a better surface fusion of the sole element may be obtained.

The upper used in the above-mentioned methods may be a textile upper and may comprise at least one of the following: a knitted construction, a woven construction, a non-woven construction, randomly deposited fibers, a multi-directional layered material, a mesh structure. Some of these textile constructions may be beneficially employed in parts of the upper that require good ventilation or breathability. Moreover, a knitted construction may provide a considerably greater stretchability owing to a textile construction due to intertwined stitches. Furthermore, a non-woven construction may provide a convenient feel at the inner surface of the upper and a suitable stability in desired portions of the textile upper may be provided.

For reinforcement and for the reduction of stretching, a fusible yarn supplemented with thermoplastic material may be used in the textile upper which fixes the knitted construction after fusing. In some embodiments, a thermoplastic yarn is surrounded by a non-thermoplastic yarn, a non-thermoplastic yarn surrounded by a thermoplastic yarn, or a pure fuse yarn of a thermoplastic material. Such a fuse yarn may be knitted into the knitted construction of the textile upper.

A strength of the bond in the above-mentioned methods may be higher than a strength of the weakest fused material. In other words, the weakest fused material fails before the strength of the bond between the plurality of individual particles and the upper. In the context of the present application, the term "strength" is the mechanical property that enables a material to resist defor-mation load, which means that the strength of a material is its capacity to withstand destruction under the action of external loads. The stronger the materials the greater the load it can withstand. Moreover, the expression "weakest fused" corresponds to a certain degree of fusibility of different materials.

The invention also concerns a system comprising means for performing the above-mentioned methods such that a shoe is manufactured in one step by bonding a compact material of the upper with a particle material of the sole element.

The invention also concerns a shoe, in particular a sports shoe, manufactured with one of the above-mentioned methods. Moreover, the shoe may not comprise an adhesive for the reasons as explained above.

DETAILED DESCRIPTION

The subject matter of embodiments of the present invention is described here with speci-ficity to meet statutory requirements, but this description is not necessarily intended to limit the scope of the claims. The claimed subject matter may be embodied in other ways, may include different elements or steps, and may be used in conjunction with other existing or future technol-ogies. This description should not be interpreted as implying any particular order or arrangement among or between various steps or elements except when the order of individual steps or arrangement of elements is explicitly described.

Possible embodiments of the different aspects of the present invention are described in the following detailed description primarily with respect to the manufacture of shoes in general, such as, for example, for sport shoes, casual shoes, laced shoes or boots such as working boots. However, it is emphasized, that the present invention is not limited to these embodiments. Ra-ther, it may also be used for different kinds of products of sports apparel with foamed and textile materials, for example, knee- or elbow protectors, wherein at least a part of the sports apparel is molded from individual particles, for example, a tennis racket, golf club, baseball bat, badminton racket, cricket bat, ice-hockey stick, hockey stick, squash racket, table-tennis bat, shin guards, etc. Moreover, the term "sports apparel" may refer to clothing, including shoes and accessories such as sports equipment, worn for sport or physical exercise. Sport-specific clothing or garments may be worn for most sports and physical exercise, for practical, comfort or safety reasons. Typical sport-specific garments may include tracksuits, shorts, T-shirts and polo shirts. Specialized garments may include swimsuits (for swimming), wet suits (for diving or surfing), ski suits (for skiing) and leotards (for gymnastics). Sport shoes may include trainers, running shoes, football shoes, basketball shoes, volleyball shoes, tennis shoes, rugby shoes, golf shoes, riding boots, snowboard boots and ice skates. Sport-specific clothing or garments also may in-dude bikini and some crop tops and undergarments, such as the jockstrap and sports bra.

Reference is further made to the fact that in the following only individual embodiments of the invention can be described in more detail. However, the skilled person will understand that the optional features and possible modifications described with reference to these specific embodiments may also be further modified and/or combined with one another in a different manner or in different sub-combinations without departing from the scope of the present invention. Individual features may also be omitted if they are dispensable to obtain the desired result. In order to avoid redundancies, reference is therefore made to the explanations in the preceding sections, which also apply to the following detailed description.

FIG. 1 illustrates the method of the present invention for manufacturing a complete shoe 100, in particular a sports shoe, by providing a plurality of individual particles 105 for a sole element 110 and providing an upper, such as a textile upper 130, in a mold 120.

The provision of the plurality of individual particles 105 may comprise the loading and/or transport of them from a container to the mold 120 via at least one feed line, for example, in an automated production line.

The provision of the textile upper 130 may be performed manually by workers and/or automatically by machines, for example, robots.

The plurality of individual particles 105 and the textile upper 130 are then fused by means of an electromagnetic field 140 to bond the plurality of individual particles 105 with each other and with the textile upper 130. The bonding of the plurality of individual particles 105 and the textile upper 130 is schematically illustrated by the two double line arrows.

The electromagnetic field 140 may be emitted from a radiation source 145, e.g. two capacitor plates, wherein one capacitor plate is connected with a radio frequency generator and the other capacitor plate is grounded. It is, however, also possible that multiple radiation or energy sources are used or one energy source may emit radiation with different frequencies and so forth, such that in these cases multiple electromagnetic fields are (linguistically) made reference to. These fields superimpose at a given point in space to form the physical electromagnetic field at this point in space.

The electromagnetic field 140 may, for example, be radiation in the microwave range, i.e. radiation with a frequency in the range from 300 MHz to 300 GHz. The electromagnetic field 140 may also be radiation in the radio frequency range, i.e. radiation with a frequency in the range from 30 kHz to 300 MHz.

It is further possible that the energy is supplied in the form of radiation from an electromagnetic field 140 in a frequency range different from the above-mentioned frequency ranges. As a specific example, the energy may be supplied in the form of ultraviolet (UV) radiation.

If the electromagnetic field 140 is radiation in the microwave range, water can be well suited as an energy absorbing material in the particles 105 and/or the textile upper 130, because irradiating water with microwave radiation leads to a heating up of the water. Also for an electromagnetic field 140 in the radio frequency range, water may be considered as energy absorbing material. In some embodiments, the energy absorbing material may comprise a metal, in particular a metal powder. Metal, for example in the form of a metal powder, can be desirable as it may absorb a particularly high amount of energy from the at least one electromagnetic field while at the same time being easily handled and dosed. A metal may, moreover, also serve the purpose of influencing the appearance of the particles 105 and/or the (textile) upper 130, if desirable, for example to provide a metallic shininess.

The particles 105 may be randomly arranged, or a combination of arranged and randomly arranged particles 105 may be used. The particles 105 may be connected at their surfaces. Materials used for the particles 105 and their advantages have been explained above.

The mold 120 may comprise different parts (not shown) such as a bottom part, a top part and a side part. In some embodiments, other mold geometries as well as more or less parts of the mold 120 may be used.

The textile upper 130 may comprise at least one of the following constructions: knitted, woven and/or non-woven. The textile material may comprise randomly deposited fibers, a multi-directional layered material and/or a mesh structure.

In some embodiments, the (textile) upper 130 may comprise a fusible yarn, at least one hot melt layer, which may act as a fusible intermediate layer or connection layer for indirect fusion between the particles 105 and the (textile) upper 130. It should be noted that such layers may be optionally, and the invention may also be performed by fusing the particles 105 and the (textile) upper 130 by means of an electromagnetic field to bond the particles 105 with each other and with the (textile) upper 130.

As mentioned above, in some embodiments, particles 105 and/or the textile upper 130 are pre-heated prior to the actual fusing of the particles 105 and the textile upper 130. In this way, the particles 105 and/or the textile upper 130 may be heated to a specific temperature first so that they are in a preferred absorption range with respect to the electromagnetic radiation from the electromagnetic field 140 that is subsequently applied for the fusing. This pre-heating may take place in the mold 120, before or during providing the particles 105 and/or the textile upper 130 to/into the mold 120.

Similar to the use of an energy absorbing material, as described above, pre-heating the particles 105 and/or the textile upper 130 may, for example, be used when trying to balance the absorption of the electromagnetic field 140 of the multiple materials of the shoe.

Pre-heating the particles 105 and/or the textile upper 130 may be desirable if it is performed prior to providing the materials for the above mentioned steps, furthermore, it may also be desirable to pre-heat whilst the mold 120 is being closed. Such pre-heating may increase the throughput of the system in performing the inventive method because the time that is required for the actual fusing step, and therefore the time needed for keeping the particles 105 and the textile upper 130 in the mold 120, may be reduced.

Additionally or alternatively, in one example, it is possible to apply an electromagnetic field 140 at a first, lower, electric power or electric voltage (e.g., during providing and/or when the particles 105 and the textile upper 130 are in the mold 120) in order to pre-heat the materials to a specific temperature. Thereafter, the electric power or electric voltage may be increased, either gradually or abruptly. The electric power or electric voltage may be applied at lower values before it gets increased also at different partial regions of the mold 120 (not shown). Thus, it becomes possible to obtain only a partial pre-heating of the particles 105 and/or the textile upper 130. This may be helpful when using particles 105 and the textile upper 130 having different properties (e.g., size or absorbing material).

In some embodiments, at least one part of the bottom part, top part or side part of the mold 120 may be pre-heated. These options may be performed with or without provide materials of the particles 105 and/or the (textile) upper 130 in the mold 120.

The electric power or electric voltage of the electromagnetic field 140 may also be increased gradually. For example, a ramp up of the radiation power may be chosen such that the complete cycle time for the production of the shoe 100 lies within a desired range for production. For example, fusing may be in the range of 40 to 70 seconds. Additionally, a cooling time of the shoe 100 after fusing may be in the range of 10 to 20 min. Compared to conventional methods for the manufacture of shoes, the inventive method may thus be significantly faster. In general, ramp up time of the radiation power can be chosen quite freely and it can be adjusted in order to control the fusion process of the surfaces of the particles 120 and the textile upper 130, thus, the overall fusion of the shoe. For example, depending on material of the particles 120, too fast a ramp up might damage the cell structure of the particles. While too slow a ramp up may be inef-ficient or lead to subpar fusion results.

After the pre-heating, the electromagnetic radiation 140 may then be applied to achieve an optimum transfer of power. This approach may also be helpful if materials are used which comprise a temperature dependent dielectric loss factor.

Here, it is again highlighted that an advantage of the present method may be that the mold 120 only absorbs a limited amount of energy compared to the materials of the particles 105 and the textile upper 130. For example, the use of epoxy resin for the manufacture of mold 120 has turned out to be beneficial. Epoxy resin may be processed to a mold 120 with complexly shaped cavities and it may comprise a low absorption power with respect to the electromagnetic field. Other methods known in the art for the manufacture of a mold with low absorption capabilities may also be used.

Figure 2A:
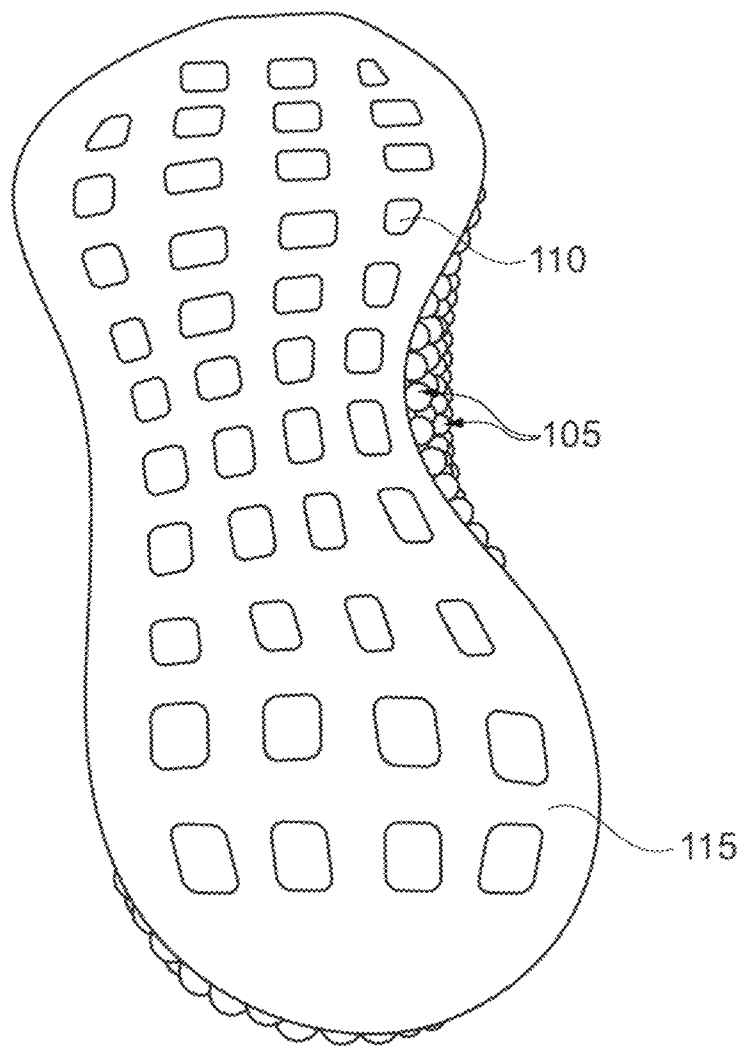
FIGS. 2*a*-2*b*: shows a manufactured sole element according to the present invention made from a plurality of individual particles after fusing the individual particles by means of an electromagnetic field to bond them with each other.
Figure 2B:
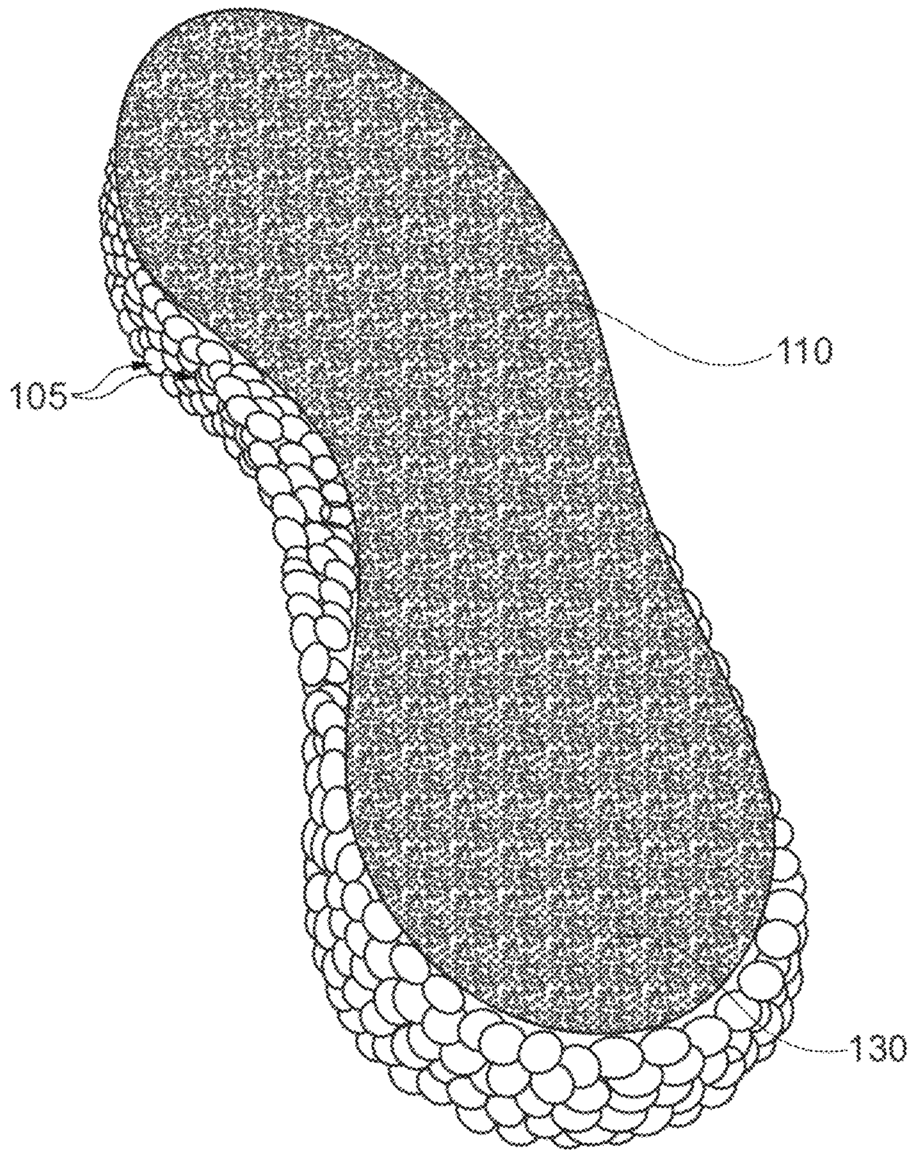

FIGS. 2*a* and 2*b* shows a manufactured sole element 110 according to the present invention made from a plurality of individual particles 105 after fusing the individual particles 105 by means of an electromagnetic field to bond them with each other.

In FIG. 2*a*, the bottom surface of the sole element 110 is shown, wherein an outsole element 115 was provided and fused by means of the electromagnetic field to bond with the plurality of individual particles 105.

Such an outsole element 115 may protect the plurality of individual particles 105 of the sole element 110.

In FIG. 2*b*, the top surface of the sole element 110 is shown with a portion of the textile upper 130 (for better understanding) after fusing the plurality of individual particles 105 and the textile upper 130 by means of the electromagnetic field to bond the plurality of individual particles 105 with each other and with the textile upper 130.

EMBODIMENTS

Embodiment 1: A method for manufacturing a shoe, in particular a sports shoe, comprising the steps of: a. providing a plurality of individual particles for a sole element in a mold; b. providing an upper in the mold; and c. fusing the plurality of individual particles and the upper by means of an electromagnetic field to bond the plurality of individual particles with each other and with the upper.

Embodiment 2: The method of the preceding Embodiment, further comprising at least one of the following steps: d. providing a supporting element for the sole element in the mold; e. providing an outsole element for the sole element in the mold; f. wherein step c. further comprises fusing the supporting element and the outsole element by means of the electromagnetic field to bond the plurality of individual particles with each other, with the supporting element, with the outsole element and with the upper.

Embodiment 3: The method of one of the preceding Embodiments, wherein step c. is performed in one single step.

Embodiment 4: The method of one of the preceding Embodiments, wherein the electromagnetic field is in the radio frequency range of 30 kHz to 300 MHz, e.g., in the range of 1 MHz to 200 MHz, in the range of 1 MHz to 50 MHz, in the range of 25 to 30 MHz or in the microwave range, 300 MHz to 300 GHz.

Embodiment 5: The method of one of the preceding Embodiments, wherein step c. is performed without an adhesive.

Embodiment 6: The method of one of the preceding Embodiments, further comprising locally adjusting a field strength distribution of the electromagnetic field within the mold.

Embodiment 7: The method of one of the preceding Embodiments, wherein energy supplied by means of the electromagnetic field is varied over time.

Embodiment 8: The method of one of the preceding Embodiments, wherein more energy by means of the electromagnetic field is supplied to the plurality of individual particles and/or the upper in a first partial region of the mold than in a second partial region of the mold.

Embodiment 9: The method of one of the preceding Embodiments, wherein step c. further comprises the step of fusing the surfaces of the plurality of individual particles and/or the surface of the upper.

Embodiment 10: The method of one of the preceding claims, further comprising arranging a connection layer between the plurality of individual particles for the sole element and the upper before step c.

Embodiment 11: The method of one of the preceding Embodiments, wherein step c. further comprises molding the sole element from the plurality of individual particles.

Embodiment 12: The method of one of the preceding Embodiments, wherein the plurality of individual particles and/or the upper are pre-heated in the mold prior to step c.

Embodiment 13: The method of one of the preceding Embodiments, wherein the mold comprises a polymer material, such as a thermoplastic material, and in some embodiments, at least one of the following: polyethylene terephthalate, PET, polybutylene terephthalate, PBT, polyoxymethylene, POM, polyamide-imide, PAI, polycarbonate, PC, polyketones, PK, polyether ether ketone, PEEK, polyvinylidene fluoride or polyvinylidene difluoride, PVDF, thermoplastic polyurethane, TPU, or polyethylene, PE.

Embodiment 14: The method of one of the preceding Embodiments, wherein the plurality of individual particles comprises a foamed material, in some embodiments, based on at least one of the following: expanded thermoplastic polyurethane, eTPU, expanded polyamide, ePA, expanded polyetherblockamide, ePEBA, polylactide, PLA, polyether-block-amide, PEBA, expanded polyethylene terephthalate, ePET, expanded polybutylene terephthalate, ePBT, expanded thermoplastic polyester ether elastomer, eTPEE, expanded polystyrene, ePS.

Embodiment 15: The method of one of the preceding Embodiments, wherein the upper is a textile upper and comprises at least one of the following: a knitted construction, a woven construction, a non-woven construction, randomly deposited fibers, a multi-directional layered material, a mesh structure.

Embodiment 16: A system comprising means for performing a method of one of the preceding Embodiments.

Embodiment 17: A shoe, in particular a sports shoe, manufactured with a method according to one of the preceding Embodiments.

Embodiment 18: The shoe of the preceding Embodiment, wherein the shoe does not comprise an adhesive.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not re-strictive purposes, and alternative embodiments will become apparent to readers of this patent. Accordingly, the present invention is not limited to the embodiments described above or depicted in the drawings, and various embodiments and modifications may be made without departing from the scope of the claims below.

The invention claimed is:

1. A method for manufacturing a shoe, comprising the steps of:

providing a plurality of individual particles for a sole element in a mold;

providing an upper in the mold; and fusing the plurality of individual particles to each other to form the sole element by means of an electromagnetic field at a first temperature, wherein the plurality of individual particles in a surface portion of the sole element facing the upper are softened;

contacting the upper with the surface portion of the sole element having softened particles and fusing the upper to the sole element by means of the electromagnetic field at a second temperature to bond the sole element with the upper;

wherein the first temperature is lower than the second temperature;

wherein the mold is formed of a material that has a higher permittivity than at least one of the individual particles and the upper; and wherein more energy by means of the electromagnetic field is supplied to the plurality of individual particles than to the upper; wherein more energy by means of the electromagnetic field is supplied in a first partial region of the mold than in a second partial region of the mold, or wherein more energy by means of the electromagnetic field is supplied to the plurality of individual particles than to the upper and wherein more energy by means of the electromagnetic field is supplied to the upper in the first partial region of the mold than in the second partial region of the mold.

2. The method for manufacturing a shoe according to claim 1, wherein the providing the plurality of individual particles further comprises:

providing a supporting element for the sole element in the mold; and providing an outsole element for the sole element in the mold; and wherein the contacting the upper further comprises fusing the supporting element and the outsole element by means of the electromagnetic field.

3. The method for manufacturing a shoe according to claim 1, wherein the fusing the plurality of individual particles to each other and the contacting the upper are performed in one single step.

4. The method for manufacturing a shoe according to claim 1, wherein the electromagnetic field is in a radio frequency range of 30 kHz to 300 MHz.

5. The method for manufacturing a shoe according to claim 1, wherein the electromagnetic field is in a radio frequency range of 300 MHz to 300 GHz.

6. The method for manufacturing a shoe according to claim 1, wherein the fusing the plurality of individual particles to each other and the contacting the upper are performed without an adhesive.

7. The method for manufacturing a shoe according to claim 1, further comprising locally adjusting a field strength distribution of the electromagnetic field within the mold.

8. The method for manufacturing a shoe according to claim 1, wherein energy supplied by means of the electromagnetic field is varied over time.

9. The method for manufacturing a shoe according to claim 1, further comprising arranging a connection layer between the plurality of individual particles for the sole element and the upper before the fusing the plurality of individual particles to each other and the fusing the plurality of individual particles to each other and the contacting the upper.

10. The method for manufacturing a shoe according to claim 1, wherein the plurality of individual particles and/or the upper are pre-heated in the mold prior to the fusing the plurality of individual particles to each other.

11. The method for manufacturing a shoe according to claim 1, wherein the mold comprises a polymer material.

12. The method for manufacturing a shoe according to claim 11, wherein the polymer material is a thermoplastic material comprising at least one of the following: polyethylene terephthalate (PET), polybutylene terephthalate (PBT), polyoxymethylene (POM), polyamide-imide (PAI), polycarbonate (PC), polyketones (PK), polyether ether ketone (PEEK), polyvinylidene fluoride, polyvinylidene difluoride (PVDF), thermoplastic polyurethane (TPU), polyethylene (PE), or combinations thereof.

13. The method for manufacturing a shoe according to claim 1, wherein the plurality of individual particles comprises a foamed material based on at least one of the following: expanded thermoplastic polyurethane (eTPU), expanded polyamide (ePA), expanded polyetherblockamide (ePEBA), polylactide (PLA), polyether-block-amide (PEBA), expanded polyethylene terephthalate (ePET), expanded polybutylene terephthalate (ePBT), expanded thermoplastic polyester ether elastomer (eTPEE), expanded polystyrene (ePS), or combinations thereof.

14. The method for manufacturing a shoe according to claim 1, wherein the upper is a textile upper and comprises at least one of the following: a knitted construction, a woven construction, a non-woven construction, randomly deposited fibers, a multi-directional layered material, a mesh structure, or combinations thereof.

15. A system comprising means for performing the method for manufacturing a shoe according to claim 1.

16. A shoe, wherein the shoe is manufactured according to claim 1.

17. The shoe according to claim 16, wherein the shoe does not comprise an adhesive.

18. A method for manufacturing a shoe, comprising the steps of:

providing a plurality of individual particles for a sole element in a mold;

providing an upper in the mold; and fusing the plurality of individual particles to each other to form the sole element by means of an electromagnetic field at a first temperature, wherein the plurality of individual particles in a surface portion of the sole element facing the upper are softened;

contacting the upper with the surface portion of the sole element having softened particles and fusing the upper to the sole element by means of the electromagnetic field at a second temperature to bond the sole element with the upper;

wherein the first temperature is lower than the second temperature;

wherein the mold is formed of a material that has a higher permittivity than at least one of the individual particles and the upper; and wherein the fusing the plurality of individual particles to each other and the contacting the upper are performed in one single step.

* * * * *